US005943091A

United States Patent [19]

Wu et al.

[11] Patent Number: 5,943,091

[45] Date of Patent: Aug. 24, 1999

[54] CAMERA WITH A VERY FAST NON-SMEAR TUBE

[75] Inventors: Zong Yan Wu, Brest; Emmanuel Daniel, Plovgonvelin, both of France

[73] Assignee: France Telecom, Paris, France

[21] Appl. No.: 09/014,230

[22] Filed: Jan. 27, 1998

[30] Foreign Application Priority Data

Jan. 29, 1997 [FR] France .................................. 97 00944

[51] Int. Cl.[6] ................................ H04N 5/33; H04N 3/16

[52] U.S. Cl. ............................................ 348/164; 348/284

[58] Field of Search .................................... 348/164, 284, 348/286, 287, 325, 326, 329, 331, 209, 327; 313/364; 250/333

[56] References Cited

U.S. PATENT DOCUMENTS

| | | | |
|---|---|---|---|
| 3,579,012 | 5/1971 | Zwicker | 131/65 |
| 3,806,751 | 4/1974 | Takemoto | 313/66 |
| 3,878,324 | 4/1975 | Tubbs | 178/7.2 |
| 3,984,630 | 10/1976 | Kogo | 178/7.2 |
| 4,471,378 | 9/1984 | Ng | 348/162 |
| 4,608,514 | 8/1986 | Kuwahata | 313/386 |
| 5,103,306 | 4/1992 | Weiman | 348/400 |

FOREIGN PATENT DOCUMENTS

| | | | |
|---|---|---|---|
| 0600476 | 6/1994 | European Pat. Off. | H01J 31/38 |
| 96/26534 | 8/1996 | WIPO . | |

OTHER PUBLICATIONS

“High–Frame–Rate Intensified Fast Optically Shuttered TV Cameras with Selected Imaging Applications”, George J. Yates et al., SPIE, vol. 2273, 1994, pp. 126–149.

“High–Frame–Rate Image Acquisition System”, W. Lawler et al., SPIE, vol. 2273, 1994, pp. 38–45.

“Image Qualification of High–Speed Film for Crash Tests”, Jerome E. Oleksy et al., SPIE, vol. 2273, 1994, pp. 155–166.

“High Frame–Rate Digital Radiographic Videography”, Nicholas S. P. King et al., SPIE, vol. 2273, 1994, pp. 86–90.

*Primary Examiner*—Wendy Garber
*Assistant Examiner*—Andrew D. Martin
*Attorney, Agent, or Firm*—Pearne, Gordon, McCoy & Granger LLP

[57] ABSTRACT

This camera comprises an electron tube with a photosensitive target (6) made of single-crystalline semiconducting material, lens (10) for forming the image of a scene on the target, an electron gun (14) to supply an electron beam to read the target, and scanning and focusing portion (18) designed to force the target to be scanned by this electron beam and to focus this electron beam on the target. The target then outputs a signal representative of this image. The camera also includes an electronic processing circuit (20) for controlling the electron gun and scanning and focusing of the camera and receiving and storing circuits (22) for receiving and storing the signal. Application to the analysis of very fast movements.

6 Claims, 1 Drawing Sheet

CAMERA WITH A VERY FAST NON-SMEAR TUBE

TECHNICAL FIELD

This invention relates to a camera with a very fast non-smear tube.

It is particularly applicable for:

recording and analyzing very fast movements, object recognition, the study of chemical and biological reactions, and the automatic control of production lines.

STATE OF PRIOR ART

A large number of very fast cameras and charge coupling devices (CCD) are known.

For further information on this subject, refer to document (1) that (like other documents mentioned later) is mentioned at this end of this description.

Cameras with a tube fitted with an electrostatic deflection and a shutter, and cameras with a tube fitted with a rotating mirror, are capable of generating high data rates in the range from $10^{10}$ Hz to $10^{13}$ Hz with a pixel density that may be low or moderate, thus supplying a frame rate within the range from $10^7$ frames per second to $10^9$ frames per second.

Cooled CCD systems with a large surface area and slow scanning have data rates measured in kHz with a high pixel density and a read out of less than one second.

These systems are described in documents (2) and (3).

Between these two extremes, very fast ,CCD systems and most video cameras have a pixel data rate between $10^6$ and $10^8$ with a frame rate varying from 30 frames per second to a few thousand frames per second.

The large range of video frame rates is due partly to the use of simultaneous read out of segments of a frame by multiporting.

Concerning the single port, the frame rate of a CCD system is limited by the inefficiency of charge transfers, the band width of integrated amplifiers and the clocking rate.

A very fast commercially available CCD system may have a pixel data rate of $32.8\times10^6$ Hz.

In other words, the resolution is equal to 128×128 pixels for a data rate of 2000 frames per second.

Cameras designed for medium resolution and high speed are available.

These cameras use a conventional camera tube and the vidicon very fast electrostatic deflection technology known under the name of *Focus Projection and Scan* (FPS).

This system is described in document (1).

The resolution and the frame rate are then given as being equal to 65 536 pixels and 625 frames per second respectively.

In reality, this type of camera can only film the movement of small objects using a fast shutter.

This system is described in document (4).

If the object is very large and illuminated by a continuous light source, then the image will be unreadable.

This is due to the fact that FPS only increases the read out rate.

But the lag of a conventional camera tube target is so great that the frames superpose each other on the target.

Consider the example of the best case of a PbO target.

Its lag is equal to 1% at the normal frame rate of 25 frames per second (three fields, 3×1/50 second).

The lag is equal to 15% at a frame rate of 60 frames per second (3 fields, 3×1/120 second).

Obviously, this is the real limit of the frame rate in an FPS camera system.

Thus, tube cameras are known that use targets for example made of PbO, but which are not capable of producing a high frame rate.

Furthermore, these known cameras require fast shutters that produce unreadable images when the observed scene is wide and illuminated by a continuous light source.

DISCLOSURE OF THE INVENTION

The purpose of this invention is to overcome the previous disadvantages by using a target with a new design and to obtain high resolution images without any shutter, without any smear and at a high rate.

Specifically, the purpose of this invention is a tube camera characterized in that it comprises:

- an electron tube, comprising:
  - a photosensitive target made of a single-crystalline semiconducting material, the thickness of which is not less than 300 $\mu$m, this target comprising a matrix of pixels each occupying a surface area of not more than 10 $\mu$m×10 $\mu$m,
  - optical means designed to form the image of a scene on the target,
  - an electron gun designed to provide an electron beam to read the target, and
  - electrostatic scanning and focusing means designed to force the target to be scanned by this electron beam and to focus this electron beam on the target so as to read the image formed on this target, the target supplying an electrical signal representative of this image,
- first electronic processing means (computer) designed to control the electron gun and the electrostatic scanning and focusing means, and
- control and storage means designed to receive the signal output by the target, to store this signal and to control the initial electronic processing means.

Due to the choice of the material and the thickness of the target and the size of the pixels, the capacitance of each pixel is not more than $5\times10^{-17}$ F.

According to one particular embodiment of the camera according to the invention, the target is made of single-crystalline silicon with resistivity exceeding 1000 Ω.cm.

According to another particular embodiment, the target is made of a single-crystalline semiconducting material sensitive to infrared radiation.

Preferably, the electron gun is designed to provide an electron beam with an intensity exceeding 200 nA.

Also preferably, the scanning and focusing means are designed to control scanning of the target at a rate within the range from 25 frames per second to 2000 frames per second.

The camera according to the invention may be provided with:

- second electronic processing means designed to process the signal stored in the control and storage means and,
- means of displaying the image represented by the signal thus processed.

BRIEF DESCRIPTION OF THE DRAWINGS

This invention will be better understood by reading the description of example embodiments given below, which are for information only and in no way restrictive, with reference to the attached drawings, in which.

DETAILED DESCRIPTION OF PARTICULAR EMBODIMENTS

Figure 1:
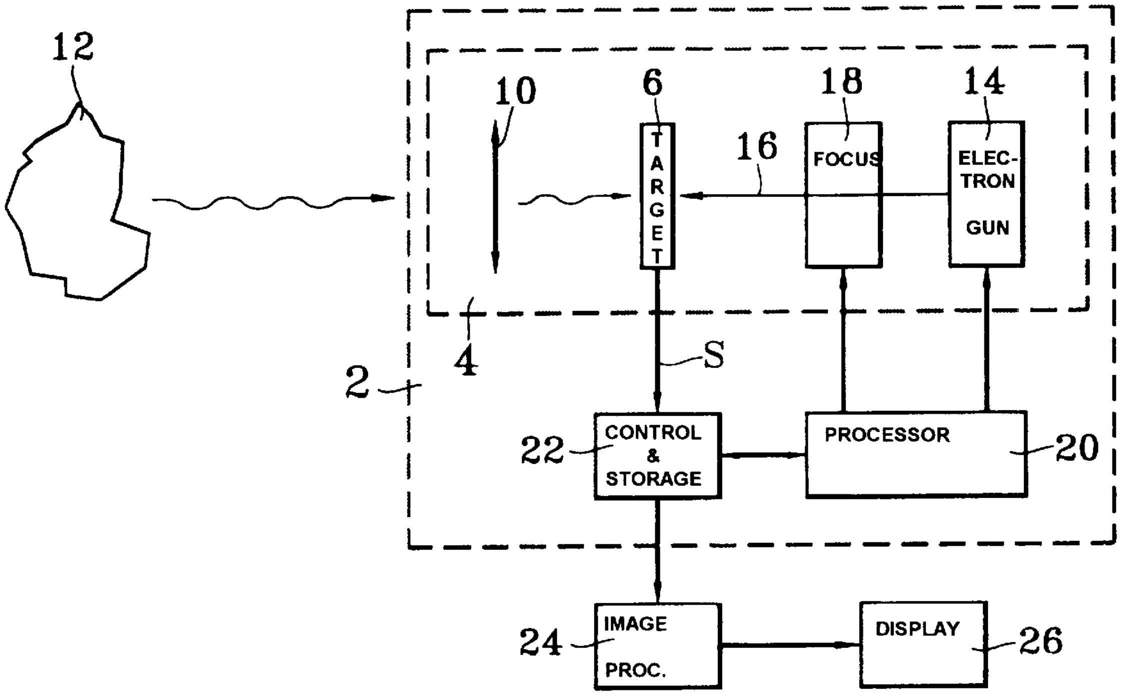
FIG. 1 is a schematic view of a particular embodiment of the tube camera according to the invention.

The camera 2 according to the invention which is shown schematically in FIG. 1 comprises an electron tube 4.

This electron tube 4 comprises:

a photosensitive target 6 that is made of a single-crystalline semi-conducting material with a thickness of at least 300 μm, this target 6 comprising a matrix of pixels 8

Figure 2:
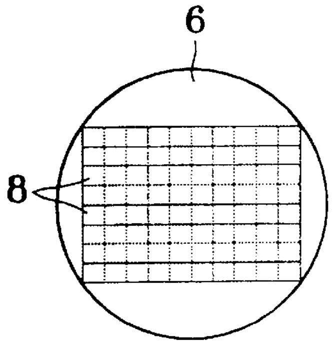
FIG. 2 is a schematic view of the target used in the camera in FIG. 1.

(FIG. 2), each occupying a surface area not exceeding 10 μm×10 μm, hence the capacitance is less than or equal to $5\times10^{-17}$ F for each pixel, optical means 10 designed to form the image of a scene 12 (for example object) on the target 6, a single electron gun 14 designed to provide a single electron beam 16 to read the information recorded in the target, pixel by pixel, electrostatic scanning and focusing means 18 designed to cause the target to be scanned by this electron beam and to be able to focus this electron beam on this target in order to read the image formed on this target, the target 6 then outputting an electric signal 5 representative of this image.

The camera 2 according to the invention also comprises:

first electronic processing means 20 designed to control the electron gun 14 and electrostatic scanning and focusing means 18, and control and storage means 22 designed to receive the signal S output by the target, to store this signal S and to control the first electronic processing means 20.

In the example shown in FIG. 1, the target 6 is made of slightly doped single-crystalline silicon with a resistivity exceeding 1000 Ω.cm.

However in other particular embodiments, the target may be made from other single-crystalline semiconducting materials, for example such as germanium, so that the camera 2 can be used with radiation other than visible light, for example infrared radiation.

In this case, the thickness of the target is still equal to at least 300 μm, and the pixels still each occupy a surface area not exceeding 10 μm×10 μm.

Returning to FIG. 1, the images are saved at high speed by camera 2 and are stored in the control and storage means 22 which include a temporary queue type memory.

These means 22 are connected to electronic means 24 of processing the images thus stored.

These means 24 may for example include a permanent memory and an image processing processor.

These means 24 are themselves connected to image display means 26.

Camera 2 according to the invention is designed to operate at a frame rate much higher than 33 frames per second without any blurring.

The pixel data rate obtained exceeds $2.62\times10^{8}$ (corresponding to a resolution of 512×512 pixels at a frame rate of 1000 frames per second), since the capacitance of each pixel is less than or equal to $5\times10^{-17}$ F.

Note that these pixels form small capacitors.

Target 6 can provide a high frame rate and a high resolution.

An electron gun 14 can be used that supplies an electron beam 16 with an intensity exceeding 200 nA (this value of 200 nA would be obtained from a conventional tube).

This can give a higher frame rate.

For example, an electron beam with an intensity equal to 400 nA may be used, the frame rate then being equal to 2000 frames per second, and the resolution still being equal to 512×512 pixels.

Scanning and focusing means 18, which use an electrostatic deflection system for scanning, contribute to obtaining a frame rate much higher than 25 frames per second and up to 2000 frames per second.

These scanning and focusing means 18 generate a scanning voltage in step form or a linear ramp voltage.

Note that the output signal S supplied by the target 6 is analog.

Camera 2 according to the invention has a number of advantages compared with very fast CCD cameras and FPS cameras with a high frame rate.

The frame rate and the resolution possible with this frame rate exceed those of a very fast CCD system and the pixel data rate may be equal to 512×512×2000.

There is no blur effect due to the use of a suitable target.

The deflection may be programmed and the scanning format may be changed.

The price of the camera is less than the price of very fast CCD cameras that are now commercially available.

Furthermore, it is possible to work in the infrared range or in other ranges if the target is made of materials sensitive to these ranges.

We will now explain the advantage of this camera:

The operating rate of a camera tube depends mainly on two factors. The first factor is the time constant of the target in the camera tube. When the target is made of a single-crystalline and relatively pure and thick semiconductor (like silicon) (thickness equal to or exceeding 300 μm), and this target is divided into pixels with a size equal to or less than 10 μm×10 μm, then the capacitance of each pixel is less than or equal to $5\times10^{-17}$ F. Thus the time constant is fairly small making it possible to work at a high rate.

The second factor is the read out rate which is limited by the scanning rate. The use of an electrostatic deflection and focusing system can deviate the electron beam at a very high rate and consequently read information (image of the scene) quickly.

The following documents are mentioned in this description:

(1) George J. Yates and Nicholas S. P. King, SPIE, vol. 2273, 1994, pp. 126–149.

(2) Lamer, W.; Harrison, L. and Aciu, A., SPIE, vol. 2273, 1994, pp. 3814 45.

(3) Kamasz, S. R.; Farrier, M. G.; Ma, F.; and Sabila, R., SPIE, vol. 2273, 1994, pp. 155–156.

(4) Nicholas S. P. King, Krank H. Cverna, Kevin L. Albright, Steve A. Jaramillo, George J. Yates and Thomas E. McDonald, SPIE, vol. 2273, pp. 86–90, 1994.

We claim:

1. Tube camera (2), characterized in that it comprises:

an electron tube (4) comprising:

a photosensitive target (6) made of a single-crystalline semiconducting material, the thickness of which is not less than 300 μm, this target comprising a matrix of pixels (8) each occupying a surface area of not more than 10 μm×10 μm, optical means (10) designed to form the image of a scene (12) on the target, an electron gun (14) designed to provide an electron beam (16) to read the target, and electrostatic scanning and focusing means (18) designed to force the target to be scanned by this electron beam and to focus this electron beam on the target so as to read the image formed on this target, the target supplying an electrical signal representative of this image, first electronic processing means (20) designed to control the electron gun and the electrostatic scanning and focusing means, and control and storage means (22) designed to receive the signal output by the target, to store this signal and to control the first electronic processing means.

2. Camera according to claim 1, in which the target (6) is made of single-crystalline silicon with a resistivity exceeding 1000 Ω.cm.

3. Camera according to claim 1, in which the target is made of a single-crystalline semiconducting material which is sensitive to infrared radiation.

4. Camera according to claim 1, in which the electron gun (14) is designed to output an electron beam with an intensity exceeding 200 nA.

5. Camera according to claim 1, in which the scanning and focusing means (18) are designed to control scanning of the target at a rate within the range from 25 frames per second to 2000 frames per second.

6. Camera according to claim 1, equipped with:

second electronic processing means (24) designed to process the signal stored in the control and storage means and, means (26) for displaying the image represented by the signal thus processed.

* * * * *